United States Patent [19]

Yamada et al.

[11] Patent Number: 5,068,155

[45] Date of Patent: Nov. 26, 1991

[54] OPAQUE, LAMINATED AND STRETCHED PRODUCTS, AND METHOD FOR MAKING THEM

[75] Inventors: Kazuhiro Yamada; Tadao Ishibashi, both of Ichihara, Japan

[73] Assignee: Chisso Corporation, Osaka, Japan

[21] Appl. No.: 567,730

[22] Filed: Aug. 15, 1990

[30] Foreign Application Priority Data

Aug. 29, 1989 [JP] Japan ................................ 1-222456

[51] Int. Cl.⁵ .............................................. B32B 27/08
[52] U.S. Cl. .................................. 428/515; 428/516; 428/517; 428/910
[58] Field of Search ............... 428/212, 517, 516, 515, 428/910

[56] References Cited

U.S. PATENT DOCUMENTS 4,293,608 10/1981 Isaka et al. ........................ 428/220
4,921,749 5/1990 Bossaert et al. .................... 428/216

FOREIGN PATENT DOCUMENTS 1227039A 10/1986 Japan .

*Primary Examiner*—Merrell C. Cashion, Jr.
*Assistant Examiner*—D. S. Nakarani
*Attorney, Agent, or Firm*—Oblon, Spivak, McClelland, Maier & Neustadt

[57] ABSTRACT

Opaque laminated and stretched products having a total light transmittance of 50% or less are obtained by laminating at least one side of a layer obtained from a composition in which a crystalline polypropylene is blended with a cyclopentadiene type petroleum resin having a softening point of 160° C. or higher, as measured by the ring-and-ball method, in an amount of 3 to 30% by weight based on the total weight of both, with a layer obtained from a crystalline propylene copolymer having a crystalline melting point lower than that of said crystalline polypropylene by 10° C. or more, and, then, stretching the resulting laminate at a temperature lower than the crystalline melting point of the crystalline polypropylene and the softening point of the cyclopentadiene type petroleum resin and at a stretching ratio of 2 or higher in at least a uniaxial direction.

6 Claims, No Drawings

OPAQUE, LAMINATED AND STRETCHED PRODUCTS, AND METHOD FOR MAKING THEM

BACKGROUND OF THE INVENTION

1. Field of the Invention

The present invention relates to opaque, laminated and stretched products composed chiefly of a polypropylene. The present invention is concerned more specifically with opaque, pearlescent and heat-sealable laminated and stretched products by laminating together an opacified, stretched layer comprising a composition in which a specific petroleum resin having a high softening point is blended with a crystalline polypropylene and a layer obtained from a crystalline propylene copolymer having a low-melting point. In the present disclosure, the term "product(s)" means sheet, film, yarn or filaments obtained by slitting such film as above, and molded products of sheet, film, etc.

2. Statement of the Prior Art

In general, pearlescent or opaque products are widely used as general-purpose packaging materials, ornamental materials, synthetic paper or transcription printing paper in the form of uniaxially or biaxially stretched films, or as packing materials, weaving yarns, etc. in the form of tapes ribbons or filaments.

As heretofore known in the art, imparting pearlescence or opaqueness to products has been achieved by (1) adding to polypropylene, lustering materials such as white pigments, extender pigments or pearlescent and others, (2) providing a large number of foams in products by adding foaming agents to polypropylene during molding, (3) adding a large amount of inorganic fillers to polypropylene when molded and, then, stretching them to provide voids therein—see Japanese Patent Publication No 63(1988)-24532 and Japanese Patent Laid-Open No. 63(1988)-117043—and (4) treating molded products with solvents or chemicals to make them dull.

These techniques, however, have the following drawbacks. That is, problems with the first technique are that it is difficult to obtain pearlescence with white pigments and extender pigments, and the pearlescent is very costly and moreover has to be added to polypropylene in large quantities. With the second technique, it is difficult to provide uniform and fine foams in thin products such as films, because the foams have a tend to become large in size. A problem with the 3rd technique is that, since the inorganic fillers are added to polypropylene in large quantities, there is a great deal of drop in fluidity during extrusion or occurrence of clogging of a screen pack. Another problem is that the inorganic fillers tend to absorb moisture, causing poor dispersion of the inorganic filler and generation of foams in the products, and the replacement of polymers in the molding-machine takes much time. Yet another problem is that the product becomes ill-lustered and roughened on its surface. A problem with the 4th technique is that it has to be carried out in the step of post-treatment and needs an additional step of removing the solvents and chemicals, suffering from a disadvantage in terms of the equipment and expense. Another problem is that the product has a dull touch and is ill-lustered.

In search of a method free from such problems of the prior art and capable of making opaque or pearlescent products easily, the present inventors have already found that if polypropylene, to which a specific amount of a petroleum resin having a specific high softening point is added, is stretched under specific conditions, it is then possible to obtain opaque, pearlescent and light-weight stretched products in which numerous fine foams are generated and which are superior in productivity to conventional ones. For that findings, the present inventors filed a patent application (Japanese Patent Application No. 1(1989)-74919). However, it has now been found that such a method is disadvantageous in that when the product is used for packaging, it loses its fine foams due to re-melting caused by heating for heat sealing during bag-making and so loses its opaqueness.

As a result of intensive studies made to overcome the drawback of the method as mentioned just above and obtain opaque and pearlescent stretched products which do not lose its opaqueness during heat sealing, it has been found that the desired stretched products can be obtained by laminating a layer obtained from a crystalline propylene copolymer having a specific low-melting point to a stretched layer obtained from a composition in which a crystalline polypropylene is blended with a specific amount of a petroleum resin having a specific high-softening point, or, if required, by laminating a crystalline propylene copolymer having a specific low-melting point to a unstretched layer obtained from the above described composition followed by stretching.

SUMMARY OF THE INVENTION

According to the first aspect of the present invention, there is provided an opaque laminated and stretched product in which a stretched layer obtained from a composition in which a crystalline polypropylene is blended with a cyclopentadiene type petroleum resin having a softening point of 160° C. or higher (as measured by the ring-and-ball method) in an amount of 3 to 30% by weight based on the total weight of both resins is laminated at least on its one side with a layer obtained from a crystalline propylene copolymer having a crystalline melting point lower than that of said polypropylene by 10° C. or more, said laminated and stretched products having a total light transmittance of 50% or less.

According to the second aspect of the present invention, there is provided an opaque laminated and stretched product in which a layer obtained from a composition in which a crystalline polypropylene is blended with a cyclopentadiene type petroleum resin having a softening point of 160° C. or higher (as measured by the ring-and-ball method) in an amount of 3 to 30 % by weight based on the total weight of both resins is laminated at least on its one side with a layer obtained from a crystalline propylene copolymer having a crystalline melting point lower than that of said polypropylene by 10° C. or more, followed by stretching, said laminated and stretched product having a total light transmittance of 50% or less.

According to the third aspect of the present invention, there is provided an opaque laminated and stretched product as recited in the first or second aspect, wherein said crystalline propylene copolymer is a copolymer of binary or more containing 70% or more by weight of a propylene component, having a crystalline melting point ranging from 115° C. to 150° C. and comprising propylene and ethylene or an α-olefin having 4 to 8 carbon atoms or a mixture of said copolymers of binary and more.

According to the fourth aspect of the present invention, there is provided an opaque laminated and stretched product as recited in the first or second aspect, wherein said cyclopentadiene type petroleum resin has a softening point equal to or higher than the crystalline melting point of said crystalline polypropylene.

According to the fifth aspect of the present invention, there is provided a method for making opaque laminated and stretched product characterized by laminating at least one side of a layer obtained from a composition in which a crystalline polypropylene is blended with a cyclopentadiene type petroleum resin having a softening point of 160° C. or higher (as measured by the ring-and-ball method) in an amount of 3 to 30% by weight based on the total weight of both with a layer obtained from a crystalline propylene copolymer having a crystalline melting point lower than that of said polypropylene type resin by 10° C. or more, and then, stretching the resulting laminate at a temperature lower than the crystalline melting point of said crystalline polypropylene and lower than the softening point of said cyclopentadiene type petroleum resin and at a stretching ratio of 2 or higher in at least a uniaxial direction.

According to the sixth aspect of the present invention, there is provided a method for making opaque laminated and stretched product characterized by uniaxially stretching a layer in the warp or weft direction, said layer being obtained from a composition in which a crystalline polypropylene is blended with a cyclopentadiene type petroleum resin having a softening point of 160° C. or higher (as measured by the ring-and-ball method) in an amount of 3 to 30% by weight based on the total weight of both, and laminating at least one side of tho stretched layer with a layer obtained from a crystalline propylene having a crystalline melting point lower than that of said crystalline polypropylene by 10° C. or more, and stretching the laminate at a ratio of 5 or more in the direction normal to that of said uniaxial stretching.

According to the seventh aspect of the present invention, there is provided a method for making opaque laminated and stretched product as recited in the fifth or sixth aspect, wherein said crystalline propylene copolymer having a low-melting point is a copolymers of binary or more containing 70% or more by weight of a propylene component, having a crystalline melting point ranging from 115° C. to 150° C. and comprising propylene and ethylene or an α-olefin having 4 to 8 carbon atoms or a mixture of said copolymers.

According to the eighth aspect of the present invention, there is provided a method for making opaque laminated and stretched product as recited in the fifth or sixth aspect, wherein said cyclopentadiene type petroleum resin has a softening point equal to or higher than the crystalline melting point of said crystalline polypropylene.

DETAILED EXPLANATION OF THE INVENTION

In the present disclosure to follow, the wording "Layer (A)" means a layer comprising a crystalline polypropylene and a cyclopentadiene type petroleum resin, and the wording "Layer (B)" means a layer obtained from a crystalline propylene copolymer having a low-melting point, both layers forming together the opaque stretched products.

The crystalline polypropylene for Layer (A) used in the present invention is a homopolymer of propylene or a copolymer of binary or more containing 70% or more by weight of a propylene component with ethylene or an α-olefin having 4 or more carbon atoms. For instance, use may be made of crystalline polypropylene, crystalline ethylene/propylene copolymer, crystalline propylene/butene-1 copolymer, crystalline propylene/hexene-1 copolymer, crystalline ethylene/propylene/butene-1 terpolymer and crystalline ethylene/propylene/hexene-1 terpolymer or their mixtures. These polymers may be obtained by the homo- or copolyermization of monomers in conventional manners such as slurry, solution and vapor-phase polymerization techniques with known stereospecific catalysts such as Ziegler-Natta catalysts and their variations. These crystalline polypropylene are well-known in the art. In the present invention, however, preference is given to resins containing 80% or more by weight of a propylene component and 80% or more by weight of residues upon extraction by boiling n-heptane.

Preferably, the crystalline polypropylene should have a melt flow rate (measured according to JIS K 7210, Test Condition 14, and hereinafter referred to as MFR for short) ranging from 0.3 to 10.

The cyclopentadiene type petroleum resin (hereinafter often referred to simply as the petroleum resin) to be incorporated into the crystalline polypropylene may be the unhydrogenated petroleum resins, one of them being a homopolymer of a cyclopentadiene type component obtained from petroleum naphtha, and the other being a copolymer of 50% or more by weight of the cyclopentadiene type component with other fractions such as monovinyl aromatic hydrocarbons and indenes, or the hydrogenated petroleum resins obtained by hydrogenation of above-mentioned unhydrogenated petroleum resins, or their mixture. The cyclopentadiene type component is a fraction composed chiefly of cyclopentadiene and di-cyclopentadiene obtained from petroleum naphtha, their oligomer, their alkyl-substituted product or their mixture. The petroleum resin may be obtained by the thermal polymerization of the cyclopentadiene type component with or without other fractions for several hours in an atmosphere of an inert gas such as nitrogen gas and others and in the presence or absence of a solvent. In order to obtain a resin having and increased softening point, this polymerization should preferably be carried out at two or more stages, rather than at a single stage. The hydrogenated petroleum resin may be obtained by hydrogenating such an unhydrogenated petroleum resin in conventional manners known in the art, for example, at a temperature of 150° to 300° C. and a hydrogen pressure of 10 to 150 kg/cm$^2$ in the presence of a solvent, using as a catalyst a metal such as palladium, nickel, cobalt or its oxide. These steps of polymerization and hydrogenation may be carried out either continuously or batchwise.

Of the cyclopentadiene type petroleum resins obtained in this way, those having a softening point (as determined by the ring-and-ball method) of 160° C. or higher should be used in the present invention. Products obtained from compositions containing petroleum resins having a softening point lower than 160° C. are so short of opaqueness and pearlescence that any desired opaque stretched product cannot be obtained. Petroleum resins having a softening point of 150° C. or lower make stretched products transparent, as is set forth in Japanese Patent Laid-Open No. 61(1986)-203140, also as is the case with the conventional hydrogenated petroleum resins known in the art. This is in contrast to what is envisaged in the present invention.

Of the hydrogenated cyclopentadiene type petroleum resins having a softening point of 160° C. or higher that is suitable for use in the present invention, particular preference is given to those having a softening point of 170° to 200° C. and an iodine value of 20 or lower, since the petroleum resins having such softening point as above are so excellent in its compatibility with the crystalline polypropylene that they can be processed stably, and give laminated and stretched products excelling in whiteness and opaqueness.

In the present invention, the crystalline polypropylene is blended with the cyclopentadiene type petroleum resin having a softening point of 160° C. or higher in an amount of the latter of 3 to 30% by weight based on the total weight of both resins to obtain a composition—hereinafter called the composition for Layer (A). If the amount of the petroleum resin to be blended is less than 3% by weight, then opacity would be so reduced that any preferrable pearlescence could not be obtained. If more than 30% by weight, on the other hand, there would be variations in extrusion and breakdowns at the time of stretching, resulting in an excessive drop in productivity.

In order to obtain opacified, laminated and stretched products with improved productivity, it is desired that 5 to 30% by weight of a hydrogenated cyclopentadiene type petroleum resin having a softening point of 165° C. or higher be incorporated into the composition for Layer (A). More desirably, 7 to 25% by weight of a hydrogenated cyclopentadiene type petroleum resin having a softening point of 170° to 200° C. be incorporated into the composition for Layer (A).

The crystalline propylene copolymer having a low-melting point for Layer (B) used in the present invention—hereinafter often called simply the low-melting copolymer—should be selected so as to have a crystalline melting point lower than that of the crystalline polypropylene by 10° C. or more, from copolymers of binary of more, or their mixtures, which are obtained by the copolymerization of the main component—propylene—with ethylene or an α-olefin having 4 or more carbon atoms by known means such as slurry, solution and vapor-phase polymerization techniques with known stereospecific catalysts such as Ziegler-Natta catalysts and their variations. A difference of less than 10° C. between the crystalline melting points is not desirable, because when the resulting laminated and stretched products is heat-sealed at a temperature at which the given peel strength is obtained with Layer (B) serving as a sealing surface, the internal state of Layer (A) changes so that only the sealed portions become semi-transparent, forming a striking contrast with the product that is opaque in its entirety and causing considerable damage to its appearance.

Preferable low-melting copolymers for Layer (B) are crystalline ethylene/propylene random copolymer, crystalline propylene/butene-1 copolymer, crystalline propylene/hexene-1 copolymer, crystalline ethylene/propylene/butene-1 terpolymer and crystalline ethylene/propylene/hexene-1 terpolymer or their mixtures, all containing 70% or more by weight of a propylene component and having a crystalline melting point ranging from 115° to 145° C. As the raw material for the Layer (B), use may also be made of a mixture of 50% or more by weight of the low-melting copolymer for Layer (B) with other polymers having a crystalline melting point or softening point which is same or lower than that of the low-melting copolymer for Layer (B).

It is noted that the term "crystalline melting point—hereinafter abbreviated to Tm" refers to a peak temperature of an endothermic curve of about 10 mg of a sample occurring during the melting of its crystals. This peak temperature is obtained in the so-called second run of the process wherein, with a differential scanning calorimeter (DSC for short), the sample is melted by heating it up to 200° C. at a heating rate of 20° C./min and the melt is then cooled down to room temperature and re-heated. In some cases, a copolymer or a mixture of two or more polymers having different Tms shows two or more Tms. In this case, a temperature showing a maximum peak area is taken as the peak temperature.

If required and not to an extent that affects adversely the aim of the present invention, the composition for Layer (A) comprising the crystalline polypropylene and the petroleum resin and the low-melting copolymer for Layer (B), used in the present invention, may additionally be blended with stabilizers, antioxidants, lubricants, slip additives, antistatics, inorganic fillers and other polymers, these substances being known to be ordinarily used with crystalline polypropylene.

The composition for Layer (A) comprising the crystalline polypropylene and the cyclopentadiene type petroleum resin used in the present invention, may be easily obtained by mixing the raw materials together in an ordinary blender or mixer. However, particular preference is given to pelletized compositions obtained by melting and hot-mixing the raw materials together, using extruders, Banbury mixers, etc. In another preferable embodiment, a large amount of the cyclopentadiene type petroleum resin is added to the crystalline polypropylene or other polymers to prepare a master batch, which is in turn mixed with the crystalline polypropylene.

The opaque laminated and stretched products of the present invention may be produced by the following methods.

(1) The composition for Layer (A) and the low-melting copolymer for Layer (B) are melt-extruded respectively through two or more extruders to laminate a layer obtained from the low-melting copolymer for Layer (B) on at least one side of a layer, serving as a core layer, obtained from the composition for Layer (A) in a molten state by means of co-extrusion multilayer casting, feed blocking or the like, thereby preparing a co-extruded raw laminate. Then, the raw laminate is stretched uniaxially or biaxially at a temperature equal to or lower than the crystalline melting point of the crystalline polypropylene for Layer (A).

(2) The composition for Layer (A) is melt-extruded to obtain a layer, which is then stretched uniaxially. By melt-extrusion, the low-melting copolymer for Layer (B) is laminated on at least one side of the thus obtained, uniaxially stretched product. Then, the obtained raw laminate is stretched in the direction normal to the direction of the first stretching.

(3) A products obtained from the low-melting copolymer for Layer (B) is overlaid on a layer obtained from the composition for Layer (A), followed by uniaxial or biaxial stretching.

(4) The composition for Layer (A) is melt-extruded and quenched to obtain a a raw extrudate, which is then stretched uniaxially or biaxially to obtain a stretched layer. Then, the copolymer for Layer (B) is extruded and laminated on that stretched layer.

Uniaxial or biaxial stretching may be achieved by either known uniaxial stretching techniques such as roll stretching, oven stretching or hot plate stretching or known simultaneous or successive biaxial stretching techniques such as tubular stretching, tentering and blow stretching. However, the stretching temperature must be lower than the crystalline melting point of the crystalline polypropylene for Layer (A). When the stretching temperature is equal to or higher than said crystalline melting point, the resulting stretched product is ill-opacified and loses pearlescence. This is because the stretched layer obtained from the composition for Layer (A) is not oriented with the result that no desired fine voids occur in the obtained stretched product. It is noted that when the layers obtained from the composition for Layer (A) and the low-melting copolymer for Layer (B) are laminated together and then stretched, i.e., Layers (A) and (B) are co-stretched, the stretching temperature or the post-treatment temperature after stretching should preferably be lower than the crystalline melting point of the crystalline polypropylene for Layer (A) and the softening point of the cyclopentadiene type petroleum resin but equal to or higher than that crystalline melting point of the low-melting copolymer for Layer (B). In particular, this is true of when the finally obtained opaque laminated and stretched product is heat-sealed on the surface of Layer (B) into a bag, since good sealability is then attained. In the successive stretching system, e.g., two-stage warp-/weft stretching, the first stage stretching may be effected at a temperature lower than the crystalline melting points of the crystalline polypropylene for Layer (A) and of the low-melting copolymer for Layer (B). However, it is preferred that the second stage stretching or the heat treatment step is carried out at a temperature lower than the melting point of the crystalline polypropylene for Layer (A) and the softening point of the cyclopentadiene type petroleum resin but equal to or higher than the crystalline melting point of the low-melting copolymer for Layer (B).

The stretching ratio applied should preferably be 2 or more at least in an uniaxial direction or, in terms of a ratio by area, be 4 or more. Particular preference is given to simultaneous or successive biaxial stretching techniques carried out at a stretching ratio by area of about 10 to 60.

Particular preference is also given to biaxially stretched products obtained by performing simultaneous or successive stretching at a temperature lower than the crystalline melting point of the crystalline polypropylene for Layer (A) and the softening point of the cyclopentadiene type petroleum resin and at a stretching ratio by area of about 20 to 50 according to the technique (1) or (2) described earlier.

After stretching, the stretched products may be heat-treated in known manners while they shrink several percents in the warp or weft direction. And they may be subjected on their surfaces to surface activation treatments such as corona discharge and plasma treatments in the air or in an inert gas atmosphere so as to improve their printability, adherence, etc.

In terms of Layer (A) defined by the layer obtained from the composition for Layer (A) and Layer (B) defined by the layer obtained from the low-melting copolymer for Layer (B), the obtained laminated and stretched products are of a basic structure of (A)/(B) or (B)/(A)/(B). However, other layers may be sandwiched between Layers (A) and (B). Printing, lamination, etc. may also be applied to the surfaces of the obtained laminated and stretched products. Depending upon stretching methods, the products may be obtained in sheet, tubular and other forms.

Although not critical, the thickness of the laminated and stretched products obtained according to the present invention may preferably be such that the thickness of Layer (B) accounts for 40% or lower, particularly 2 to 20%, of their overall thickness. This is because as the thickness ratio of Layer (B) to Layer (A) in the products is higher than a certain value, both opaqueness and surface gloss tend to drop with a large decrease in rigidity.

The laminated and stretched products obtained according to the present invention are substantially opacified, as expressed in terms of a total light transmittance of 50% or less, and maintain such properties even when heat-sealed at filling and packaging steps. A total light transmittance exceeding 50% results in lack of opaqueness.

EXAMPLES AND COMPARATIVE EXAMPLES

More illustratively, the present invention will now be explained specifically but not exclusively with reference to the following examples and comparative examples.

The characteristic values given throughout the present disclosure were estimated by the following methods.

(1) Softening Point (the ring-and-ball method)

JIS K 2207 (°C.).

(2) Iodine Value

JIS K 0070$_{-1966}$. This value refers to the number in terms of grams of iodines absorbed in unsaturated components in 100 g of a sample.

(3) Total Light Transmittance

JIS K 6714 (%).

(4) Gloss

ASTM D 523 (measured at an angle of 20° C.; %).

(5) Melt Flow Rate (MFR)

JIS K 7210$_{-1976}$, Testing Condition 14 (at 230° C. and 2.16 kgf; g/10 mm).

(6) Density

Measured was the weight per 1 m$^2$ of a sample, which was turned into a weight per 1 cm$^2$ and divided by its thickness (cm). (g/cm$^3$).

(7) Heat Sealing Temperature

Samples, overlaid one upon the other, were heat-sealed at a sealing pressure of 2 kg/cm$^2$ for 1 second with a bar type heat sealer. The peel strength of the sealed portions was determined with a tensile tester (at a tensile speed of 300 mm/min), and a sealing temperature at which the peel strength reached 300 g/15 mm was then determined.

EXAMPLE 1

In an extruder, a crystalline polypropylene for Layer (A) comprising a crystalline polypropylene having an MFR of 2.5, a Tm of 163° C. and 96% by weight of matter insoluble in boiling n-heptane (containing as antioxidants 0.2% by weight of BHT, 0.1% by weight of Irganox 1010 made by Chiba Geigy Co., Ltd. and 0.1% by weight of calcium stearate) was melted and mixed at 230° C. with a hydrogenated cyclopentadiene, type petroleum resin for Layer (A) having a softening point of 172° C. and an iodine value of 10, the amount of the latter being 18% by weight of the total amount of both resins, and the mixture was then cooled down to obtain a pelletized composition for Layer (A).

As the low-melting copolymer for Layer (B), a crystalline ethylene/propylene/butene-1 terpolymer having a propylene content of 91% by weight, an MFR of 4.5 and a Tm of 130° C. (containing as antioxidants 0.1% by weight of BHT, 0.1% by weight of Irganox 1010 and 0.1% by weight of calcium stearate and as a slip agent 0.12% by weight of erucamide) was prepared in pellet form. Using two extruders and a in-die lamination type two-feed-triple-layer die connected thereto, the pellet of the composition for Layer (A) was fed into one extruder having a bore diameter of 40 mm, while the pellet of the low-melting copolymer for Layer (B) was fed into the other extruder having a bore diameter of 30 mm. Both the pellets were melted and extruded at 250° C. through the extruders, and then laminated together in the two-feed-triple-layer die into a structure of (B)/(A)/(B), while they were in a molten state. The melt laminate was subsequently cooled on a mirror-finished cooling roll of 40° C. to obtain a sheet-like raw laminate having a total thickness of 1.3 mm comprising a core layer (A) having a thickness of 1.1 mm and surface layers (B) each having a thickness of 0.1 mm. This raw laminate was cut into a square piece. With a pantagraph type biaxial stretching equipment, the piece was stretched at an oven temperature of 153° C. and at a stretching ratio of 5 in the direction of flowing of the sheet (i.d. warp direction) at the time of lamination, and then stretched at a stretching ratio of 8.5 in the direction normal thereto (i.d. weft direction). Thereafter, the product was heat-treated at the same temperature for 10 second, while it was biaxially shrunk about 3%. Subsequent air-cooling gave a consecutively biaxially stretched film having a thickness of about 40 μm. By measurement, this film was found to have a density of 0.67, a total light transmittance of 24%, a gloss of 62% and a heat sealing temperature of 127° C. Thus, the obtained film was opaque and pearlescent and underwent no appreciable changes in the opaqueness, gloss, etc. of the heat sealed portions.

COMPARATIVE EXAMPLE 1

The pelletized composition used for Layer (A) in Example 1 was melt extruded alone at 250° C. through an extruder having a bore diameter of 40 mm and a T-die, and then quenched on a mirror-finished cooling roll of 40° C. to obtain a sheet-like raw product having a thickness of 1.1 mm. The raw product was cut into a square piece, which was in turn biaxially stretched in a similar manner as in Example 1, thereby obtaining a film having a thickness of about 38 μm. This film was found to be opaque and pearlescent, as expressed in terms of a total light transmittance of 22% and a gloss of 51%. However, the result of heat sealing test of this film made with a bar type heat sealer indicated that it showed no adhesion even at a heat sealing temperature of 155° C. and was so shrunk at higher temperatures than 155° C. that any sealing test was not possible at all. When heat-sealed at 155° C., the film was not bonded together as stated above, and in the heat-sealed portions there became so extinct fine foams that they were made semi-transparent, forming a striking contrast to the unsealed portions.

COMPARATIVE EXAMPLE 2

In place of the terpolymer used as the copolymer pellet for Layer (B) in Example 1, the use made of a crystalline ethylene/propylene random copolymer having an ethylene content of 1.8% by weight, an MFR of 6.0 and a Tm of 154° C. The feeds were formed into a structure of (B)/(A)/(B) by two-feed-triple-layer co-extrusion as in Example 1 to obtain a sheet-like raw laminate having a total thickness of 1.3 mm comprising a core layer (A) having a thickness of 1.1 mm and surface layers (B) each having a thickness of 0.1 mm. In a similar manner as in Example 1, this raw laminate was cut into a square piece, which was in turn consecutively subjected to biaxial stretching at an oven temperature of 156° C. and at the same stretching ratio with a pantagraph type of biaxial stretching equipment, heat-treated and air-cooled to obtain a film having a thickness of about 40 μm.

This film was found to be pearlescent and opaque, having a density of 0.65 and a total light transmittance of 20%. However, the heat sealing temperature was 153° C., at which the heat sealed portions lost their opaqueness and pearlescence and so was made semi-transparent and dull, forming a striking contrast to the unsealed, opaque and pearlescent portions.

EXAMPLE 2

In place of the copolymer used for Layer (B) in Comparative Example 2, use was made of a crystalline ethylene/propylene random copolymer having an ethylene content of 4.2% by weight, an MFR of 5.0 and a Tm of 143° C. In a similar manner and under similar conditions as in Comparative Example 2, a sheet-like raw laminate was formed and then subjected to successive biaxial stretching to obtain a film of about 40 μm in thickness. This film was found to have a density of 0.68, a total light transmittance of 25%, a gloss of 65% and a heat sealing temperature of 138° C. At this heat sealing temperature, the heat-sealed portions showed opaqueness and pearlescence nearly similar to those of the unsealed portions, having a fairly nice appearance.

EXAMPLES 3~6 & COMPARATIVE EXAMPLES 3~6

A crystalline polypropylene for Layer (A) having an MFR of 3.0, a Tm of 162° C. and 95% by weight of matter insoluble in boiling n-heptane (containing the same amounts of the same additives as those used for Layer (A) in Example 1) was blended with various cyclopentadiene type resins having different softening points in the amounts specified in Table 1 to obtain various compositions for Layer (A). As the low-melting copolymer for Layer (B), prepared was also the same crystalline ethylene/propylene/butene-1 terpolymer as used in Example 1.

Using the same two extruders and a two-feed-triple-layer die as in Example 1, sheet-like raw laminates were formed at a temperature of 240° C., each comprising a core layer (A) having a thickness of 0.8 mm and surface layers (B) each having a thickness of 0.1 mm or having a total thickness of 1.0 mm. Each raw laminate was cut into a square piece, which was in turn biaxially stretched at an oven temperature of 155° C. and at stretching ratios of 5.2 in the warp and weft directions with a pantagraph type biaxial stretching equipment, heat-treated at the same temperature as above under tension for 15 seconds, and air-cooled to obtain a film of 40 to 60 μm in thickness. The characteristic values of the obtained films are also set out in Table 1.

As can be seen from Table 1, the softening points of the cyclopentadiene type petroleum resins have a large influence upon developing fine internal foams, and the films of the present invention are much superior to the comparative ones in terms of effects owing to uniform and fine foams such as reductions in density (weight savings) and reductions in total light transmittance (opacification).

TABLE 1

| | Cyclopentadiene Type Petroleum Resins | | | Characteristic Values of Films | | |
|---|---|---|---|---|---|---|
| | Softening Point (°C.) | Iodine Value | Amount (wt. %) | Thickness (μm) | Density (g/cm³) | Total Light Transmittance (%) |
| Comparative Example 3 | — | — | — | 40 | 0.91 | 95 |
| Comparative Example 4 | 120 | 9 | 15 | 40 | 0.92 | 97 |
| Comparative Example 5 | 150 | 12 | 15 | 40 | 0.92 | 96 |
| Example 3 | 165 | 11 | 15 | 47 | 0.75 | 32 |
| Example 4 | 173 | 12 | 15 | 50 | 0.70 | 27 |
| Example 5 | 173 | 12 | 25 | 55 | 0.62 | 18 |
| Example 6 | 183 | 14 | 15 | 54 | 0.63 | 24 |
| Comparative Example 6 | 183 | 14 | 2 | 43 | 0.88 | 70 |

The laminated and stretched products such as films, yarns or filaments obtained by slitting such films, and hollow containers, obtained according to the present invention contain uniform and fine foams therein, are of light weight, excel in cushioning properties and are characterized by opaqueness and light shielding properties. Moreover, they have improved melt-adhesive property or heat sealability so that they can be formed into bags and adhered to other articles by heating while their nice appearances are kept intact. Thus, they can be widely used for general purpose packing materials, ornamental materials, binding materials and other purposes.

We claim:

1. An opaque laminated and stretched heat-sealable product comprising a stretched first layer of crystalline polypropylene resin blended with a cyclopentadiene-derived petroleum resin having a softening point of 160° C. or higher, as measured by the ring-and-ball method, in an amount of 3 to 30% by weight based on the total weight of both resins; said first layer is laminated on at least one side with a second layer obtained from a crystalline propylene copolymer having a crystalline melting point at least 10° C. lower than that of said crystalline polypropylene resin, wherein said laminated and stretched product has a total light transmittance of 50% or less.

2. An opaque laminated and stretched heat-sealable product comprising a first layer of crystalline polypropylene resin blended with a cyclopentadiene-derived petroleum resin having a softening point of 160° C. or higher, as measured by the ring-and-ball method, in an amount of 3 to 30% by weight based on the total weight of both resins, that is laminated on at least one side with a second layer obtained from a crystalline propylene copolymer having a crystalline melting point at least 10° C. lower than that of said crystalline polypropylene resin, followed by stretching, wherein said laminated and stretched product has a total light transmittance of 50% or less.

3. An opaque laminated and stretched product as recited in claim 1 or 2, wherein said crystalline propylene copolymer contains two or more comonomers including at least 70% by weight of propylene, said copolymer having a crystalline melting point ranging from 115° C. to 150° C.

4. An opaque laminated and stretched product as recited in claim 1 or 2, wherein said cyclopentadiene-derived petroleum resin has a softening point equal to or higher than the crystalline melting point of said crystalline polypropylene.

5. An opaque laminated and stretched product of claim 3 wherein said crystalline propylene copolymer contains at least 70% propylene and ethylene or an α-olefin having 4 to 8 carbon atoms.

6. An opaque laminated and stretched product as recited in claims 1 or 2 which has been heat-sealed and has a total light transmittance of 50% or less at the seal.

* * * * *